United States Patent [19]
White

[11] Patent Number: 6,029,916
[45] Date of Patent: Feb. 29, 2000

[54] SYSTEM AND METHOD FOR DECOMPOSING RECLAIMING AND REFUSING WASTE CARPET MATERIALS

[75] Inventor: David Wayne White, LaGrange, Ga.

[73] Assignee: Terra Technologies, Inc., La Grange, Ga.

[21] Appl. No.: 09/008,374

[22] Filed: Jan. 16, 1998

[51] Int. Cl.$^7$ ................................................ B02C 19/12
[52] U.S. Cl. ............................................ 241/24.19; 241/29
[58] Field of Search ............................. 241/79.1, 76, 77, 241/78, DIG. 38, 29, 19, 24.12, 24.19, 24.18, 24.29

[56] References Cited

U.S. PATENT DOCUMENTS

| | | | |
|---|---|---|---|
| 5,497,949 | 3/1996 | Sharer | 241/76 |
| 5,518,188 | 5/1996 | Sharer | 241/29 |
| 5,535,945 | 7/1996 | Sferrazza et al. | 241/29 |
| 5,722,603 | 3/1998 | Costello et al. | 241/24.18 |

*Primary Examiner*—Mark Rosenbaum
*Attorney, Agent, or Firm*—Darby & Darby

[57] ABSTRACT

A system and method for reclaiming backing material from waste carpet or other products includes a chopper capable of handling large pieces of waste carpet, at least two grinding or granulation steps to reduce the size of the waste carpet pieces and to dislodge carpet fibers from the remaining material, and at least three separation steps to remove the dislodged fibers; one of the separation steps involves vibratory screening. Backing material reclaimed in this manner has a relatively low contamination level, and is suitable for reuse as carpet backing with little need for the addition of virgin backing material. The system and method further provide for the extrusion of the reclaimed backing material for use as new carpet backing.

3 Claims, 4 Drawing Sheets

SYSTEM AND METHOD FOR DECOMPOSING RECLAIMING AND REFUSING WASTE CARPET MATERIALS

The invention relates to a system and method whereby floor covering materials are decomposed into fibrous material and granular backing material for recycling purposes, and more particularly to a system and method capable of taking used carpet pieces, carpeted floor tiles, or similar products, separating them into their constituent materials, including a fibrous material and thermoplastic substrate or backing material, and passing the reclaimed materials to a recycling operation for reuse.

BACKGROUND OF THE INVENTION

In this era of increased environmental awareness, it is becoming less acceptable to simply discard used or spent materials of any kind. The United States alone generates many millions of tons of unrecycled trash every year. Although it is recognized that some materials are not feasibly reclaimable (such as food, medical supplies, and certain metals and plastics), an increasing number of materials are reusable after treating the material and reforming the material into new items.

Because of this, there is an increasing level of pressure to keep as much material as possible out of landfills. Many safely situated landfills and disposal areas near urban areas, in particular, are already filled to capacity or approaching full capacity. Therefore, in order to properly dispose of many items, new disposal sites must be found. In most cases, these new sites are either further away or less desirable than the existing sites. Accordingly, the cost of simply "throwing away" solid waste is increasing, both in terms of monetary expense (to find and ship to more remote locations) and the environment (committing an increasing amount of scarce physical resources to trash).

Although incineration is frequently useful as an alternative to disposing of solid waste items in a landfill or other disposal site, there is also increasing pressure from the environmentally conscious to reduce incineration as a means of disposal. Although incineration can reduce the bulk of materials shipped to disposal, there are other risks. First, incineration causes air pollution. Although sophisticated exhaust scrubbing systems exist to reduce this problem, these systems are frequently expensive and inefficient.

Moreover, although soot, carbon monoxide, carbon dioxide, ozone, nitrous oxides, and sulfur compounds are the typical results of incinerating trash (and the primary constituents of "smog"), these are only a few of the potential by-products of incinerating trash that includes man-made materials, especially polymers. The incineration of such materials can result in the release of potentially toxic materials, which are frequently difficult to control.

Of course, recycling is one possible means of avoiding the problems with landfills and incineration. Effective recycling procedures exist for many materials, including paper, aluminum, glass, and many plastics. However, man-made articles that are fabricated from more than one material are frequently difficult to recycle, as there can be recycling incompatibilities between the materials. For example, a chemical that is useful to dissolve and separate one type of plastic material may have adverse effects on the properties of other materials that are bound to the recycled plastic.

The foregoing difficulties have rendered it difficult to recycle used carpeting with any kind of efficiency. Carpeting frequently consists of two or more layers of backing material, a binding material (such as a glue), a reinforcing web, and a fibrous pile material. These materials are frequently incompatible with each other in a recycling operation. For example, the means used to separate and reuse a layer of the backing material might affect the usefulness of the pile material. Alternatively, a chemical used in the recycling process might dissolve two or more of the components, causing them to intermix and form a blend of the two materials having less desirable properties. The application of heat to melt certain materials can have the same effect.

Several attempts have been made to avoid the problems inherent in recycling a complex man-made item comprising several materials, and to successfully recycle carpet.

U.S. Pat. No. 5,230,473 to Hagguist et al. uses a combination of chemical, heat, and mechanical means to strip and separate the various components from reclaimed carpet. However, the Hagguist system has several disadvantages. It is a complex system that uses a variety of means to separate the materials, and it attempts to separate the various pile and substrate materials while leaving the backing largely intact. Therefore, the Hagguist system can be extremely expensive. Moreover, it uses potentially volatile and toxic chemicals, as well as pressurized water and steam. Finally, the scheme taught by Hagguist has not been found to be feasible or economically practicable, as it requires waste carpet that is in substantially large and flat pieces, and does not produce a level of contamination that is sufficiently low for efficient recycling.

U.S. Pat. Nos. 5,497,949 and 5,518,188 to Sharer employ mechanical means to decompose carpet into its constituent materials. However, the apparatus and method disclosed by the Sharer patents have been found to be inefficient and result in unacceptable levels of contamination between carpet fibers and backing material. Although this problem can be diminished by mixing reclaimed materials with a substantial amount of new or "virgin" material, this is inefficient and should be avoided.

In light of the various shortcomings of prior attempts to effectively recycle spent carpeting, a need is recognized for a system and method capable of effectively and efficiently separating the constituent materials of used carpeting, so that those materials can be effectively recycled into new product with a minimum of discarded material and a minimum need to add virgin material to reduce contamination levels.

A further need is recognized for a scheme that makes effective and efficient use of the reclaimed materials in new carpeting. The need for virgin material should be kept to a minimum, in order to decrease costs and increase the amount of old material that is converted into new carpeting.

SUMMARY OF THE INVENTION

The present system and method is capable of recycling carpet and similar heterogeneous materials at higher levels of efficiency and lower levels of contamination than have previously been accomplished. To accomplish this, the invention uses at least three separate mechanical grinding stages (including a coarse chopping operation) and at least three separate separation stages, configured in a unique and advantageous manner.

The present invention is also capable of reusing much of the reclaimed material in new products.

As discussed above, carpet materials typically have several layers of different materials. The simplest types of carpet might have fibrous pile material (nylon, for example)

fused directly to a thermoplastic backing. However, there can also be a secondary binder or substrate layer, a reinforcing web material through which the pile is attached, or a separate glue material that is used to anchor the pile to the backing. The present invention is operative to separate the lightweight fibrous pile from the remaining materials, so that the separate types of materials can be recycled.

In recognition of the observation that the heavier backing materials reclaimed from a carpet recycling operation are presently more recyclable than are the lighter fibrous materials, the present invention ensures that as much as possible of the fibrous materials are removed from the backing materials, thereby reducing contamination and facilitating reuse of the backing materials.

More specifically, the invention first chops used waste carpet into relatively small pieces capable of being handled by an air conveyor system. The carpet materials are then ground into pieces small enough to fit through a ½ inch screen. At that time, the materials are separated into two categories: light materials are passed to a baling apparatus, and heavy materials continue through the separation process. The heavy materials are then ground again, into pieces small enough to fit through a ⅛ inch screen. The materials are separated again, with the light portion going to the baler, and the heavy materials continuing.

A vibratory screener is then used to separate the remaining materials into two further categories. The light materials are baled, and the heavy materials are again subjected to a separator. The fibers from this stage are baled, and the remaining heavy materials are collected and reused.

At this stage, the heavy materials, comprising primarily the backing from the original waste carpet, can have a contamination level of less than two percent. Accordingly, the material is useful in a variety of applications, including the formation of new carpet.

In one embodiment of the invention, the reclaimed backing material is conveyed to a blender, at which time it can be blended in a specified ratio with new or "virgin" material, if desired; melted; extruded from a die; and affixed as new backing to a carpet having new fibers, webbing, or other materials, and then used as desired.

Although the invention is primarily discussed herein as being directed to recycling used carpet materials, it should be noted that the invention is also capable of decomposing and reclaiming materials from other materials that are comprised of materials of different densities, such as plastic bottles and their labels, other plastic consumer articles (such as telephones), and automotive interiors (such as dashboards and trunk liners).

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

A carpet recycling system according to the invention has two stages. In the first stage, the reclamation stage, used carpet pieces are processed and converted into reclaimed material. In the second stage, the reuse stage, materials recovered in the reclamation stage are formed into new carpet material.

Figure 1:
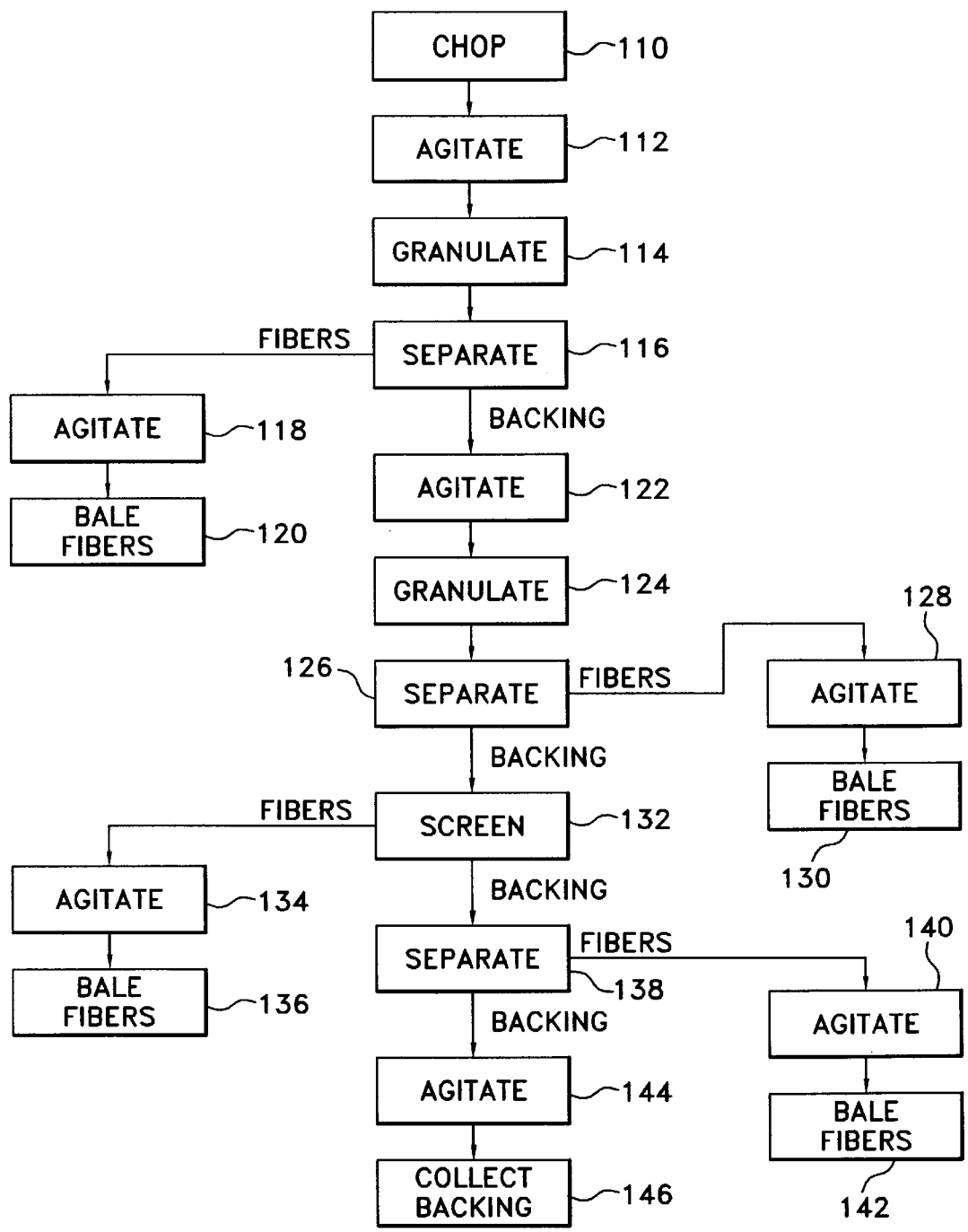
FIG. 1 is a block diagram illustrating the steps performed in the separation stage of a carpet recycling system according to the invention.

Referring initially to FIG. 1, a block diagram is set forth which functionally details the reclamation stage of a carpet recycling system according to the invention. First, old carpet material in any size is received and chopped (step 110) into manageable pieces, typically from ½ inch to several inches in size. These pieces are then agitated (step 112) in a cyclone. This step serves at least three purposes. First, the cyclone regulates the feed rate of the chopped carpet pieces in the system. Second, the cyclone dissipates excess air in the conveying stream. Third, the cyclone mechanically disturbs the carpet pieces, causing excess material and fibers to be dislodged from the backing. All of the material is then passed to a first grinding or granulation step (step 114), at which time the carpet pieces are further ground into a smaller size. This step also serves to further dislodge carpet fibers from the backing.

The granulated material is then sent to a first separation step (step 116), in which the dislodged fibers are again agitated (step 118) and baled (step 120) for storage, eventual use, or to be discarded. The remaining materials, namely everything except the dislodged fibers recovered at step 116, are again agitated (step 122). The materials are then passed to a second granulation step (step 124), at which time even smaller pieces are made. These smaller pieces are separated in a second separation step (step 126); the fibers are again agitated (step 128) and baled (step 130).

The materials remaining from the second separation step are then screened (step 132) on a vibratory screener. The light materials, or fibers, are agitated (step 134) and baled (step 136). The remaining pieces are again subjected to a third separation step (step 138). The resulting fibers are agitated (step 140) and baled (step 142). The remaining material is nearly all backing material; it is agitated (step 144) and collected (step 146) for storage and reuse.

This procedure represents a unique combination of granulation, separation, and screening steps that has been found to result in the recovery of backing material with exceptionally low rates of contamination. This material can then be reused in new carpet backing or other products with the addition of little or no virgin material.

Figure 2:
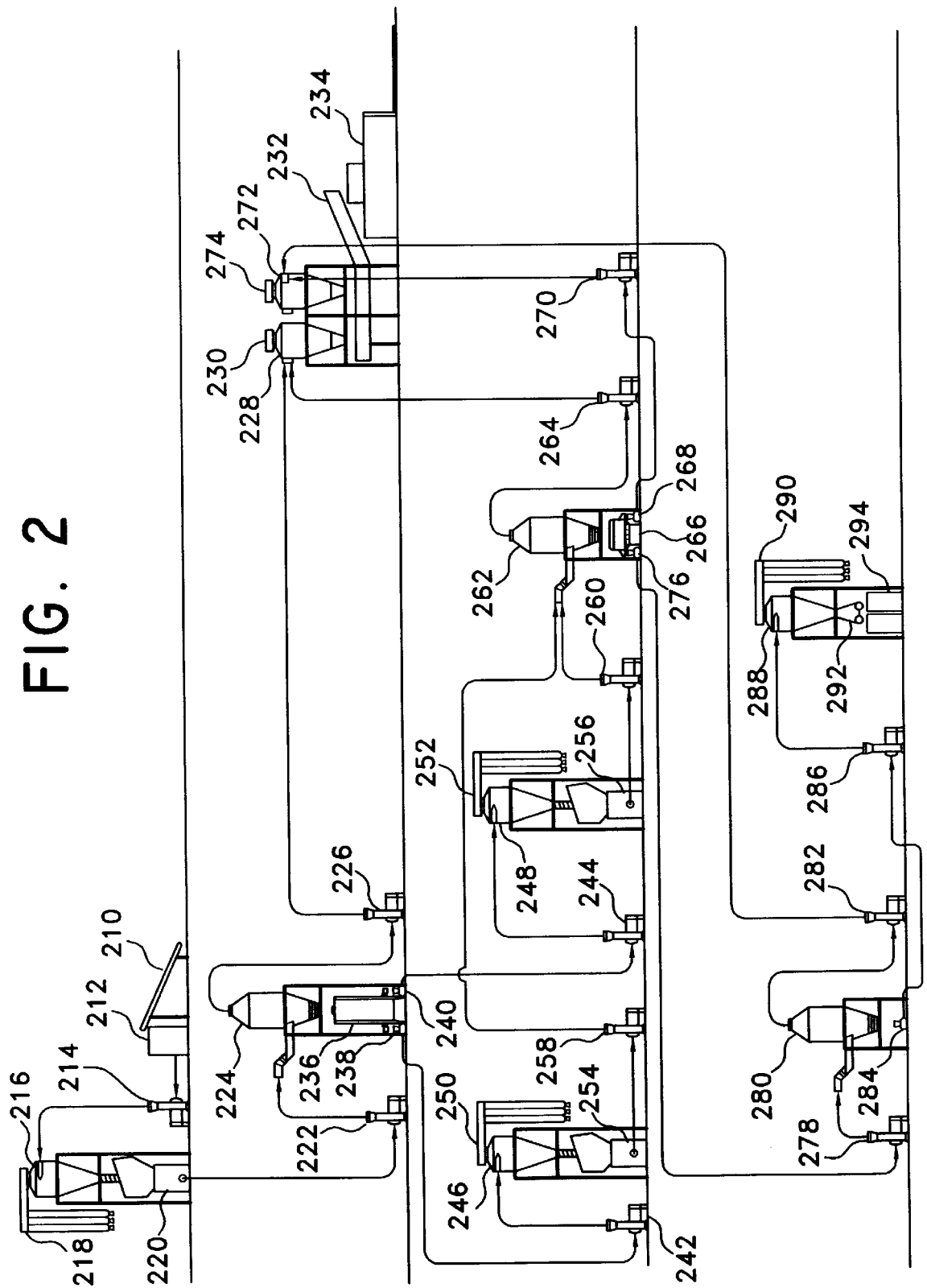
FIG. 2 is a schematic drawing of the separation stage of the carpet recycling system set forth functionally in FIG. 1.

The reclamation stage of the invention set forth functionally above will now be considered in conjunction with FIG. 2, which schematically illustrates the equipment that is used to perform the reclamation stage.

Waste carpet is received at a conveyor 210 and fed into a chopper 212. The chopper may take the form of a "knife hog," a shredder, or a grinder, and should be able to process the raw carpet material into pieces small enough to be handled by an air-driven conveyor system, e.g., from approximately ½ inch to several inches. In a preferred embodiment of the invention, the chopper 212 comprises a knife hog.

The chopped carpet pieces are then fed via a blower 214 into a cyclone 216. The cyclone entrains the carpet pieces in a spiral airflow. As discussed above, this accomplishes at least three purposes: it regulates the speed at which the carpet material is fed through the system, dissipates excess air, and it agitates the carpet pieces to physically dislodge carpet fibers from the backing. In a preferred embodiment of the invention, the cyclone 216 used at this position is a #13 cyclone; such devices are available from a variety of sources. The cyclone has a side-mounted filter 218; this is used to trap any fibers from the air that is normally discharged from the unit. Although the cyclone 216 is not intended as a primary means of separating carpet fiber from the backing, a small quantity of carpet fibers is normally found in the cyclone's airstream. The filter 218 prevents these fibers from being discharged into the environment.

From the cyclone 216, the carpet materials are dropped into a granulator 220. The granulator grinds the carpet materials into smaller pieces. In a preferred embodiment, the granulator 220 is a model X1400 granulator from Cumberland Manufacturing Corp., and the unit is set to grind the materials until they are able to fit through a ⅜ to ½ inch screen. The ½ inch screen size is presently preferred. As discussed above, not only does the granulator 220 reduce the size of the carpet pieces being handled by the system, it tends to physically dislodge the carpet web and fiber material from the backing material.

The granulated pieces are then passed by a blower 222 to an elutriator 224. An elutriator is a separating device that uses a vertically-directed airstream to separate light materials from heavy materials. In the present system, the carpet fibers are far lighter than the backing materials, and are captured by the airstream and directed to a first output. The heavier materials are not diverted by the airstream, and are directed to a second output. The lighter materials, namely the carpet fibers, are conveyed by a blower 226 from the elutriator 224 to a #21 cyclone 228. This cyclone 228 again agitates the materials, in this case carpet fibers. The cyclone 228 also bears a side-mounted filter 230 to prevent the undesired discharge of fibers. The cyclone 228 deposits its carpet fibers into an auger conveyor 232, at which time the fibers are conveyed into a baler 234.

The baler 234 receives, compresses, and bales carpet fibers reclaimed by the system. The bales of fibers may then be stored, discarded, or incinerated; preferably, they are reused in a portion of the carpet recycling operation.

The heavier materials in the elutriator 224 are dropped into a dual auger separator 236. The separator divides the stream of materials into two approximately equal streams, both of which are then processed in parallel by the system. One stream is handled by a first air conveyor 238, and the other stream is handled by a second air conveyor 240. The two streams of carpet materials are then drawn by blowers 242 and 244 into two cyclones 246 and 248, which again regulate and agitate the carpet materials. The cyclones 246 and 248 are fitted with filters 250 and 252 to prevent the discharge of carpet fibers into the environment. At this step of the reclamation stage of the invention, the use of a #9 cyclone is presently preferred.

The two cyclones 246 and 248 drop the carpet materials into two granulators 254 and 256. These granulators 254 and 256, which in a preferred embodiment of the invention are model X1000 granulators from Cumberland Manufacturing Corp., grind the carpet materials until the pieces are smaller than a screen size, which can range from ⅛ inch to ½ inch (preferably ⅛ inch). As discussed above, the stream of materials is divided into two separate streams by the separator 236. Using two parallel #9 cyclones 246 and 248 and two granulators 254 and 256 has been found to reduce the incidence of any "bottleneck" of material flow caused by the ⅛ inch screen size in the granulators, which is significantly smaller than the ½ inch screen in the previous granulator 220. The two granulators 254 and 256 then send the materials via blowers 258 and 260 to a single elutriator 262. The elutriator 262 separates the light materials (carpet fibers) from the heavy materials (backing and other materials). The light materials are passed via a blower 264 to the cyclone 228, and the fibers are eventually baled as previously discussed. The heavy materials are discharged into a vibratory screener 266. The screener 266, which in a preferred embodiment is a device from Midwest Screen, Inc., also separates light fibrous materials from heavy materials. The light materials (again, fibers) are collected in an air conveyor 268, and pulled via a blower 270 into a cyclone 272. The cyclone 272, which is preferably a #19 cyclone, bears a side-mounted filter 274, and discharges its materials into the conveyor 232, which feeds the baler 234.

The heavy materials from the screener 266 are received by an air conveyor 276 and passed via a blower 278 to an elutriator 280. The elutriator 280 passes its carpet fibers through a blower 282 to the cyclone 272, and the fibers are baled. The heavy materials from the elutriator 280 now have extremely low levels of contamination from carpet fibers, as the fibers have been removed at four separate steps. The heavy materials, primarily carpet backing pieces, are passed via a blower 286 to a cyclone 288 (preferably a #10 cyclone), which removes the last remaining trace of fibers via a filter 290, and drops the backing pieces through a diverter valve 292 into a hopper 294.

Figure 3:
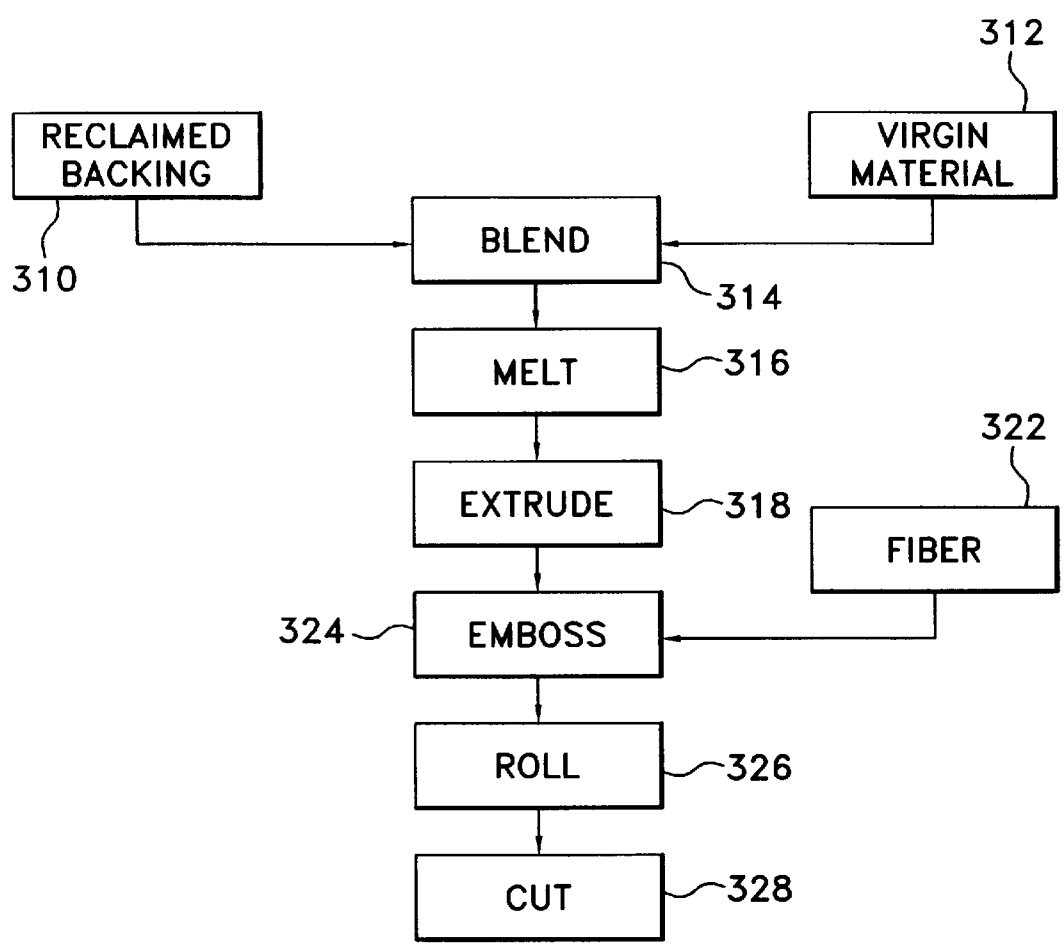
FIG. 3 is a block diagram illustrating the steps performed in the backing material reuse stage of the carpet recycling system.

The carpet backing pieces collected in the hopper 294 are suitable for further processing in accordance with the invention, as substantially all fibers have been removed and baled. The carpet backing can then be used by the reuse stage of the invention, which is set forth functionally in the block diagram of FIG. 3.

Reclaimed backing material 310, which in one embodiment of the invention is received directly from the hopper 294, is first blended (step 314) with a quantity of virgin material 312 according to a specified "recipe." In one embodiment of the invention, the reclaimed material 310 may be of sufficient quality and quantity that no virgin material 312 is necessary. However, for varying qualities of reclaimed material 310 and varying desired qualities for the finished product, differing amounts of virgin material 312 can be used in the invention. Moreover, coloring agents and other materials can be added at this step, if desired.

The blended material is then melted (step 316) and thoroughly mixed to form a homogeneous liquid. This hot liquid carpet backing material is then extruded (step 318) in a shape suitable for use as new carpet backing. While it is still hot, but after it has cooled sufficiently to retain its shape, the newly formed carpet backing material is combined with new fiber 322 material and embossed together (step 324) into new carpet. In an alternative embodiment, the fiber 322 and newly formed carpet backing material can be glued together with a separate adhesive; this can be accomplished after the backing material has cooled. The new carpet is then rolled (step 326) and cut (step 328), if desired, into pieces of the desired size and shape.

Figure 4:
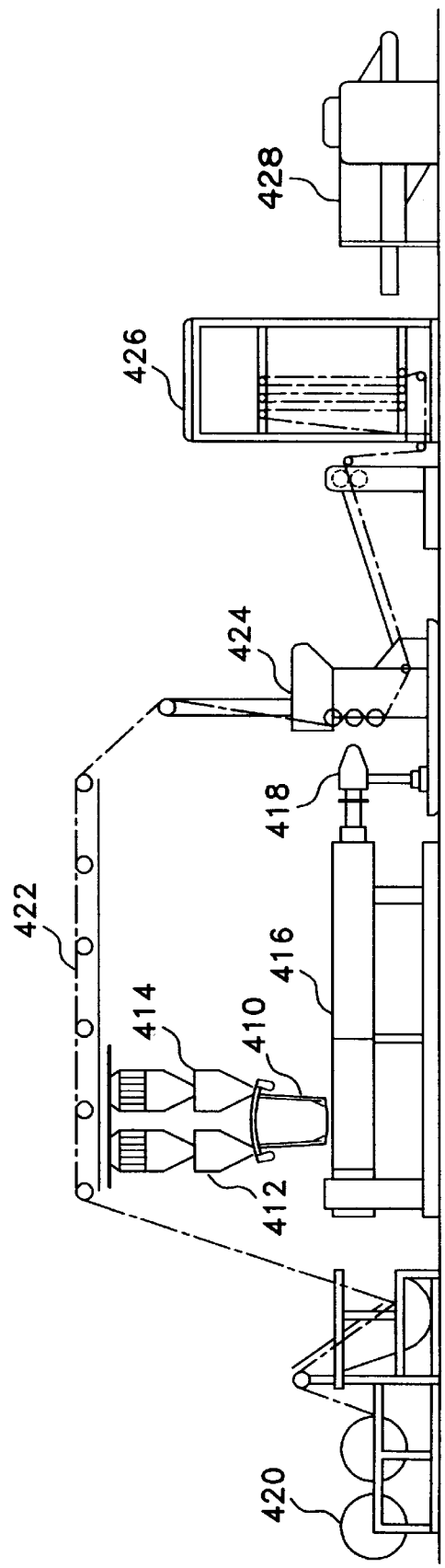
FIG. 4 is a schematic drawing of the backing reuse stage of the carpet recycling system set forth functionally in FIG. 3.

The equipment used to perform the reuse stage of the invention is set forth schematically in FIG. 4. A blender 410 receives reclaimed backing material in a first hopper 412 and virgin material in a second hopper 414. Two types of blenders are suitable for use with the invention. A volumetric blender is adjustable to feed material from hoppers at different speeds. A gravimetric blender, which is preferred for this application, allows material to be fed from the hoppers at a prescribed weight ratio; this is typically more precise. In a preferred embodiment of the invention, an X-series continuous gravimetric blender from Process Control Corp. is used as the blender 410.

The blender 410 feeds the specified ratio and quantity of materials into an extruder 416. The extruder 416 includes a barrel with an internal auger that acts to feed the materials through the extruder while they are being heated by heater bands mounted to the barrel. The auger mixes and advances the melted materials toward a die 418. The extruder 416 forces the melted material through the die 418, which causes the material to assume a desired shape.

The new carpet web and fibers to be used with the new carpet are kept on rolls 420 and fed via an overhead conveyor 422 to a roll stand 424. At the roll stand 424, the extruded backing material is pressed against the new web and fiber material to form new carpeting. In the disclosed embodiment of the invention, new carpet webbing and fibers are affixed to the melted material at the roll stand 424. In various alternative embodiments of the invention, other fibrous materials, such as felt or fiberglass, can be affixed to the backing material for different applications.

The new carpeting is then cooled, gathered and rolled in an accumulator 426, and cut as desired on a cutting press 428.

While various specific devices and subsystems have been disclosed above for use in an exemplary embodiment of the invention, it should be noted that an apparatus and method according to the invention need not involve those particular brands and types of equipment; other comparable devices can be substituted.

Further, while the invention has been disclosed and described in relation to a used carpet recycling operation, it should be observed that the invention is equally applicable to recycling various other types of materials, such as plastic bottles, other plastic consumer articles, automotive interiors (such as dashboards, trunk liners, and other similar parts), and other recyclable products that include materials of different densities.

While certain exemplary structures and operations have been described, the invention is not so limited, and its scope is to be determined according to the claims set forth below.

What is claimed is:

1. A method for reclaiming backing material from heavy-backed waste carpet material, comprising the steps of:

chopping the heavy-backed waste carpet into pieces sufficiently small to be conveyed by a blower;

grinding the waste carpet pieces into intermediate pieces to partially dislodge carpet fibers from the waste carpet material;

separating the dislodged carpet fibers from the intermediate pieces;

further grinding the intermediate pieces into final pieces to further dislodge carpet fibers;

separating the dislodged carpet fibers from the final pieces of waste carpet material;

screening the final pieces of waste carpet material into light material and heavy material; and collecting the heavy material as reclaimed backing material.

2. The method of claim 1, further comprising the step of passing the light material and the dislodged carpet fibers to a baler.

3. A method for reclaiming a heavy material from a discarded, heavy-backed product comprising a light material and the heavy material, comprising the steps of:

chopping the product into pieces sufficiently small to be conveyed by a blower;

grinding the product into intermediate pieces to partially dislodge the light material from the product;

separating the dislodged light material from the intermediate pieces;

further grinding the intermediate pieces into final pieces to further dislodge the light material;

separating the dislodged light material from the final pieces of product;

screening the final pieces of product into the light material and the heavy material; and collecting and reclaiming the heavy material.

* * * * *